Patented June 15, 1943

2,321,783

UNITED STATES PATENT OFFICE 2,321,783

MANUFACTURE OF CAST PHENOLIC RESINS

Charles S. Webber and Stewart B. Luce, Springfield, and Frederick M. Murdock, Chicopee Falls, Mass., assignors to Monsanto Chemical Company, St. Louis, Mo., a corporation of Delaware No Drawing. Application March 31, 1939, Serial No. 265,344

18 Claims. (Cl. 260—34)

Our present invention has to do with the manufacture of cast phenolic resins made by the condensation of phenol and formaldehyde. In accordance with one process of manufacture phenol and formaldehyde have been reacted in the presence of soda ash or other suitable alkali and after the reaction is complete, the resin has been dehydrated by boiling under vacuum until it is substantially free from water. The mix is then acidified by the addition of lactic acid in excess of the equivalent of the alkali after which the mixture is heated further. A softener, ordinarily glycerine, is then added, the material is boiled down and thickened until the desired viscosity is reached and it is cast and hardened in the usual manner. Resins made in this way with glycerine as a softener tend to absorb water to some extent and may blister on prolonged exposure to hot or cold water. Their impact strength is less than is desirable and the material is relatively hard to work and brittle.

We have discovered that it is possible to reduce the tendency to water absorption by two-thirds and the tendency to blister on the exposure to either hot or cold water; also, that the impact strength can be increased from 50 to 125 percent, the working of the material made easier, the resin made tougher and the hardness increased so that it is less likely to scratch. These important and useful results are accomplished by using what we term "a phenolic softener" alone or in combination with certain other materials as, for instance, methyl (or ethyl) phthalyl ethyl glycollate, these substances being usually added to the mix after the initial reaction, the dehydration, and the acidification have been performed, although it is possible to produce a similar result if proper additions to the mix during the alkaline reaction stage are made under conditions such that there will remain in the mix after neutralization phenol or a proper derivative thereof with formaldehyde.

In the following description the word "phenol" is intended to denominate a substance having a formula $C_6H_5OH$, but it will be apparent to those skilled in the art that other phenols or equivalent substances may be employed in certain circumstances.

The phenolic material used as a softener may be either unreacted phenol or soluble fusible phenolic resins of the Novolak type. (See Ellis, The Chemistry of Synthetic Resins.)

In practicing our improved process, we proceed in general as had been done heretofore in the manufacture of cast phenolic resins in which glycerine has been employed as a softener. This procedure is conveniently referred to as comprising six steps or stages; (1) initial reaction of the materials under alkaline conditions, (2) dehydration by heating in a vacuum, (3) acidification, (4) addition of the softener, (5) thickening by boiling, (6) casting, (7) curing.

A procedure will now be described for making a cast phenolic resin embodying our invention where perfect clarity is not required but maximum strength and workability are desirable.

*Stage 1.—Initial reaction.*—The following materials are mixed and placed in a suitable vacuum kettle.

| | Parts by weight |
|---|---|
| Phenol | 100 |
| Formaldehyde (37% solution) | 258 |
| Soda ash | 5 |
| Lactic acid (50% solution) | 1.7 |

These are reacted for 2½ hours at 65° C., with stirring and under a vacuum of 20 to 22 inches of mercury. This degree of vacuum does not distill off any appreciable amount of the reactants but does prevent air from coming in contact with the mix thus preventing discoloration.

*Stage 2.—Dehydration.*—The resin is then boiled under a higher vacuum starting from 25 or 26 inches and ending at from 28 to 29 inches. The temperature is maintained at 50° C., throughout the period and heating is carried on from 3 to 6 hours depending on the size of the batch and the efficiency of the condensers.

*Stage 3.—Acidification.*—After the resin has been sufficiently dehydrated the temperature is raised to 65° C., while still under the high vacuum and 19.5 parts of 50% solution of lactic acid is added. This is a 25% excess over the equivalent theoretically required to neutralize the soda ash. Heating is continued at 65° for fifteen minutes under the same vacuum and approximately 200 parts of base resin containing about 10% of water is produced.

Up to this point the process is in accordance with common procedure and produces what is referred to hereafter as the base or intermediate resin.

*Stage 4.—Addition of the softener.*—If the regular procedure were adhered to, glycerine would then be added, the resin would be heated until the desired viscosity is reached and then cast and hardened in the usual manner. Such a resin as already pointed out is deficient in certain respects which it is the object of the present invention to improve. In accordance with the present invention, several possible addition agents or combinations of addition agents may now be added to give to the resulting product the desired physical properties.

*Example A.—Phenol.*—To 100 parts of the base resin prepared as described above 4 to 12 parts of unreacted phenol may be added, the resin thickened under the vacuum, and then cast and cured in the usual manner. When 8 parts of phenol are used, which is the amount preferred, the resulting product is more hazy than when glycerine is used but the water absorption of the resin is reduced about two-thirds, the tendency to blister on exposure to hot or cold water is reduced, the impact strength is increased about 50%, the working of the material is made easier, and the resin is tougher and it is less likely to scratch.

*Example B.—Phenol plus methyl phthalyl ethyl glycollate.*—To 100 parts of the base or intermediate resin prepared as described above 4 to 12 parts of phenol, preferably 8 parts, and from 3 to 5 parts of methyl phthalyl ethyl glycollate, preferably 4 parts, are added and the resin completed, cast and cured as usual. This product is clearer than when phenol alone is used and has the other advantages derived from the use of phenol.

*Example C.—Phenol and formaldehyde.*—To 100 parts of the intermediate resin are added from 4 to 12 parts of phenol, preferably 8 parts, and from 5 to 14 parts of 37% formaldehyde solution. When added at this stage, the additional phenol and formaldehyde react under acid conditions, the batch having been already acidified and, therefore, we believe tend to form an acid condensed resin similar to Novolak which, in the case where a molar deficiency of formaldehyde is used, may be true Novolak. The batch is completed as already described. This product is slightly more hazy than the preceding but the impact strength is increased from 100 to 125%. Larger amounts of formaldehyde seem to improve the clarity without perceptible decrease in strength.

*Example D.—A phenolic compound of the Novolak type.*—To 100 parts of the base or intermediate resin are added 10 parts of a phenolic compound of the Novolak type, this Novolak made as follows:

| | Parts |
|---|---|
| Phenol | 100 |
| Formaldehyde (37% solution) | 65 |
| Phthalic anhydride | 5 | are refluxed under a water cooled condenser until the mix becomes turbid by the separation of water. The mixture is then dehydrated until clear, either by vacuum distillation or by boiling in the open. The resulting product is a phenolic resin of the Novolak type. This Novolak resin may be added to the base resin as a softener, after which the resin is finished in the usual manner. The resulting resin is similar in its physical properties to that made with phenol plus methyl phthalyl ethyl glycollate but has somewhat more haze.

*Example E.—A phenolic compound of the Novolak type with methyl phthalyl ethyl glycollate.*—10 parts of the phenolic compound of the Novolak type described in the preceding example and from 3 to 8 parts of methyl phthalyl ethyl glycollate are added to 100 parts of the base or intermediate resin and the resin completed as described. The clarity of this resin is superior to the clarity of the preceding resin. The other properties are about the same.

*Example F.—A phenolic compound of the Novolak type added after the initial reaction.*—We have also found that it is possible to obtain similar results by adding a proper amount of the phenolic resin of the Novolak type (made as described in Example D) to the mix at the end of the initial reaction (stage 1) and before dehydration (stage 2). An example of this procedure is as follows:

10 parts of the phenolic compound of the Novolak type made as previously described is added to 100 parts of the base resin immediately after the condensation reaction has been carried on at 65° C. for 2½ hours. After acidification 4 parts of methyl phthalyl ethyl glycollate are added as this assists in reducing the haze. The resulting product has an increase in breaking strength of about 125%; and the time necessary for curing it is decreased about 25%. More than 10 parts of the phenolic compound of the Novolak type may be added but in that case the increase in impact strength is only from 40 to 50%.

The methyl phthalyl glycollate acts as a clarifying agent. Other similar esters of glycollic acid, such as ethyl phthalyl ethyl glycollate may be employed provided they are soluble in the cast phenolic resin. The preferred glycollates are esters of phthalyl glycollic acid made from an alcohol with not more than three carbon atoms. Butyl phthalyl butyl glycollate is insoluble and, therefore, is not suitable. These materials tend to clarify the resin and reduce the haze whether used in conjunction with phenol, or with a phenolic compound of the Novolak type or alone.

We claim:

1. In the method of making phenolic resins suitable for casting, the steps which comprise reacting substantially one molecular proportion of phenol with a large excess over one molecular proportion of formaldehyde under alkaline conditions, partially dehydrating the initial reaction product under reduced pressure, acidifying the liquid reaction mixture, and then adding an ester of phthalyl glycollic acid made from a monohydric alcohol with not more than three carbon atoms, and increasing the toughness and workability of the cured resin while maintaining hardness and high water resistance by combining with the liquid reaction mixture a phenolic body selected from the group consisting of phenol and phenol reacted with formaldehyde to form a resin of the Novolak type, and thickening the resin so formed by dehydration under reduced pressure.

2. In the method of making phenolic resins suitable for casting, the steps which comprise reacting substantially one molecular proportion of phenol with a large excess over one molecular proportion of formaldehyde under alkaline conditions, acidifying the liquid reaction mixture, and then adding an ester of phthalyl glycollic acid made from a monohydric alcohol with not more than three carbon atoms, and increasing the toughness and workability of the cured resin while maintaining hardness and high water resistance by combining with the liquid reaction mixture a phenolic body selected from the group consisting of phenol and phenol reacted with formaldehyde to form a resin of the Novolak type.

3. In the method of making phenolic resins suitable for casting, the steps which comprise reacting substantially one molecular proportion of phenol with a large excess over one molecular proportion of formaldehyde under alkaline conditions, partially dehydrating the liquid reaction product under reduced pressure, acidifying the liquid reaction mixture, and then adding an ester of phthalyl glycollic acid made from a monohydric alcohol with not more than three carbon atoms, and increasing the toughness and workability of the cured resin while maintaining hardness and high water resistance by combining with the liquid reaction mixture a phenolic body selected from the group consisting of phenol and phenol reacted with formaldehyde to form a resin of the Novolak type.

4. In the method of making phenolic resins suitable for casting, the steps which comprise reacting substantially one molecular proportion of phenol with substantially three molecular proportions of formaldehyde under alkaline conditions, acidifying the liquid reaction mixture, and then adding an ester of phthalyl glycollic acid made from a monohydric alcohol with not more than three carbon atoms, and increasing the toughness and workability of the cured resin while maintaining hardness and high water resistance by combining phenol with the liquid reaction mixture.

5. In the method of making phenolic resins suitable for casting, the steps which comprise reacting substantially one molecular proportion of phenol with substantially three molecular proportions of formaldehyde under alkaline conditions, partially dehydrating the initial reaction product under reduced pressure, acidifying the liquid reaction mixture, then adding an ester of phthalyl glycollic acid made from a monohydric alcohol with not more than three carbon atoms, and increasing the toughness and workability of the cured resin while maintaining hardness and high water resistance by combining phenol with the liquid reaction mixture, and thickening the resin so formed by dehydration under reduced pressure.

6. A cast phenol formaldehyde resin prepared by reacting substantially one molecular proportion of phenol with a large excess over one molecular proportion of formaldehyde under alkaline conditions, partially dehydrating the initial reaction product under reduced pressure, acidifying the liquid reaction mixture, and then adding an ester of phthalyl glycollic acid made from a monohydric alcohol with not more than three carbon atoms, and increasing the toughness and workability of the cured resin while maintaining hardness and high water resistance by combining with the liquid reaction mixture a phenolic body selected from the group consisting of phenol and phenol reacted with formaldehyde to form a resin of the Novolak type, and thickening the resin so formed by dehydration under reduced pressure, pouring into a mold, and curing by heating.

7. A phenol formaldehyde resin suitable for casting, prepared by reacting substantially one molecular proportion of phenol with a large excess over one molecular proportion of formaldehyde under alkaline conditions, acidifying the liquid reaction mixture, and then adding an ester of phthalyl glycollic acid made from a monohydric alcohol with not more than three carbon atoms, and increasing the toughness and workability of the cured resin while maintaining hardness and high water resistance by combining with the liquid reaction mixture a phenolic body selected from the group consisting of phenol and phenol reacted with formaldehyde to form a resin of the Novolak type.

8. A phenol formaldehyde resin suitable for casting, prepared by reacting substantially one molecular proportion of phenol with a large excess over one molecular proportion of formaldehyde under alkaline conditions, partially dehydrating the liquid reaction product under reduced pressure, acidifying the liquid reaction mixture, and then adding an ester of phthalyl glycollic acid made from a monohydric alcohol with not more than three carbon atoms, and increasing the toughness and workability of the cured resin while maintaining hardness and high water resistance by combining with the liquid reaction mixture a phenolic body selected from the group consisting of phenol and phenol reacted with formaldehyde to form a resin of the Novolak type.

9. A phenol formaldehyde resin suitable for casting, prepared by reacting substantially one molecular proportion of phenol with substantially three molecular proportions of formaldehyde under alkaline conditions, acidifying the liquid reaction mixture, and then adding an ester of phthalyl glycollic acid made from a monohydric alcohol with not more than three carbon atoms, and increasing the toughness and workability of the cured resin while maintaining hardness and high water resistance by combining phenol with the liquid reaction mixture.

10. A cast phenol formaldehyde resin prepared by reacting substantially one molecular proportion of phenol with substantially three molecular proportions of formaldehyde under alkaline conditions, partially dehydrating the initial reaction product under reduced pressure, acidifying the liquid reaction mixture, then adding an ester of phthalyl glycollic acid made from a monohydric alcohol with not more than three carbon atoms, and increasing the toughness and workability of the cured resin while maintaining hardness and high water resistance by combining phenol with the liquid reaction mixture, and thickening the resin so formed by dehydration under reduced pressure, pouring into a mold and curing by heating.

11. A cast phenol formaldehyde resin prepared by reacting substantially one molecular proportion of phenol with substantially three molecular proportions of formaldehyde in a weakly alkaline condition, partially dehydrating the initial reaction product under reduced pressure, acidifying the liquid reaction mixture by the addition of lactic acid, and then adding an ester of phthalyl glycollic acid made from a monohydric alcohol with not more than three carbon atoms, and increasing the toughness and workability of the cured resin while maintaining hardness and water resistance by combining with the liquid reaction mixture a relatively small amount of phenol, and thickening the resin so formed by dehydration under reduced pressure, pouring into a mold, and curing by heating.

12. A cast phenol formaldehyde resin prepared by reacting substantially one molecular proportion of phenol with substantially three molecular proportions of formaldehyde in a weakly alkaline condition, partially dehydrating the initial reaction product under reduced pressure acidifying the liquid reaction mixture by the addition of lactic acid, and then adding an ester of phthalyl glycollic acid made from a monohydric alcohol with not more than three carbon atoms, and increasing the toughness and workability of the cured resin while maintaining hardness and water resistance by combining with the liquid reaction mixture a relatively small proportion of a resin of the Novolak type formed by reacting phenol with formaldehyde, and thickening the resin so formed by dehydration under reduced pressure, pouring into a mold, and curing by heating.

13. In the method of making phenolic resins suitable for casting, the steps which comprise reacting substantially one molecular proportion of phenol with a large excess over one molecular proportion of formaldehyde under alkaline conditions, acidifying the liquid reaction mixture, and then adding an ester of phthalyl glycollic acid made from a monohydric alcohol with not more than three carbon atoms, and increasing the toughness and workability of the cured resin while maintaining hardness and high water resistance by combining phenol with the liquid reaction mixture.

14. In the method of making phenolic resins suitable for casting, the steps which comprise reacting substantially one molecular proportion of phenol with a large excess over one molecular proportion of formaldehyde under alkaline conditions, acidifying the liquid reaction mixture, and then adding an ester of phthalyl glycollic acid made from a monohydric alcohol with not more than three carbon atoms, and increasing the toughness and workability of the cured resin while maintaining hardness and high water resistance by combining with the liquid reaction mixture phenol reacted with formaldehyde to form a resin of the Novolak type.

15. In the method of making phenolic resins suitable for casting, the steps which comprise reacting substantially one molecular proportion of phenol with substantially three molecular proportions of formaldehyde under alkaline conditions, acidifying the liquid reaction mixture, and then adding an ester of phthalyl glycollic acid made from a monohydric alcohol with not more than three carbon atoms, and increasing the toughness and workability of the cured resin while maintaining hardness and high water resistance by combining with the liquid reaction mixture phenol reacted with formaldehyde to form a resin of the Novolak type.

16. A phenol formaldehyde resin, suitable for casting, prepared by reacting substantially one molecular proportion of phenol with a large excess over one molecular proportion of formaldehyde under alkaline conditions, acidifying the liquid reaction mixture, and then adding an ester of phthalyl glycollic acid made from a monohydric alcohol with not more than three carbon atoms, and increasing the toughness and workability of the cured resin while maintaining hardness and high water resistance by combining phenol with the liquid reaction mixture.

17. A phenol formaldehyde resin, suitable for casting, prepared by reacting substantially one molecular proportion of phenol with a large excess over one molecular proportion of formaldehyde under alkaline conditions, acidifying the liquid reaction mixture, and then adding an ester of phthalyl glycollic acid made from a monohydric alcohol with not more than three carbon atoms, and increasing the toughness and workability of the cured resin while maintaining hardness and high water resistance by combining with the liquid reaction mixture phenol reacted with formaldehyde to form a resin of the Novolak type.

18. A phenol formaldehyde resin, suitable for casting, prepared by reacting substantially one molecular proportion of phenol with substantially three molecular proportions of formaldehyde under alkaline conditions, acidifying the liquid reaction mixture, and then adding an ester of phthalyl glycollic acid made from a monohydric alcohol with not more than three carbon atoms, and increasing the toughness and workability of the cured resin while maintaining hardness and high water resistance by combining with the liquid reaction mixture phenol reacted with formaldehyde to form a resin of the Novolak type.

CHARLES S. WEBBER.
STEWART B. LUCE.
FREDERICK M. MURDOCK.